July 2, 1963
R. E. RISLEY
3,096,105
SPLIT ARRESTOR HAVING CIRCUMFERENTIALLY EXTENDING GRAIN
STRUCTURE FOR WELDED PIPELINES HAVING LONGITUDINALLY
EXTENDING GRAIN STRUCTURE
Filed Sept. 9, 1960
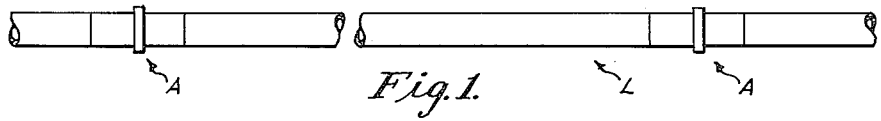
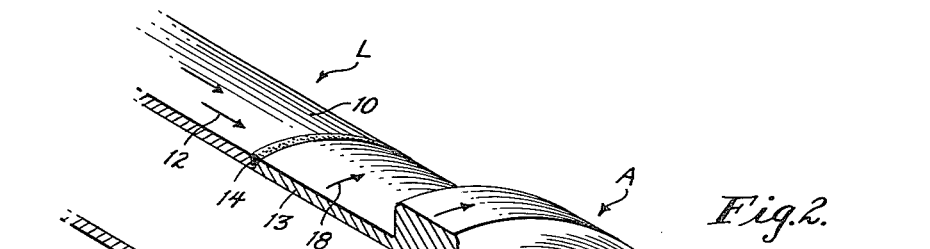
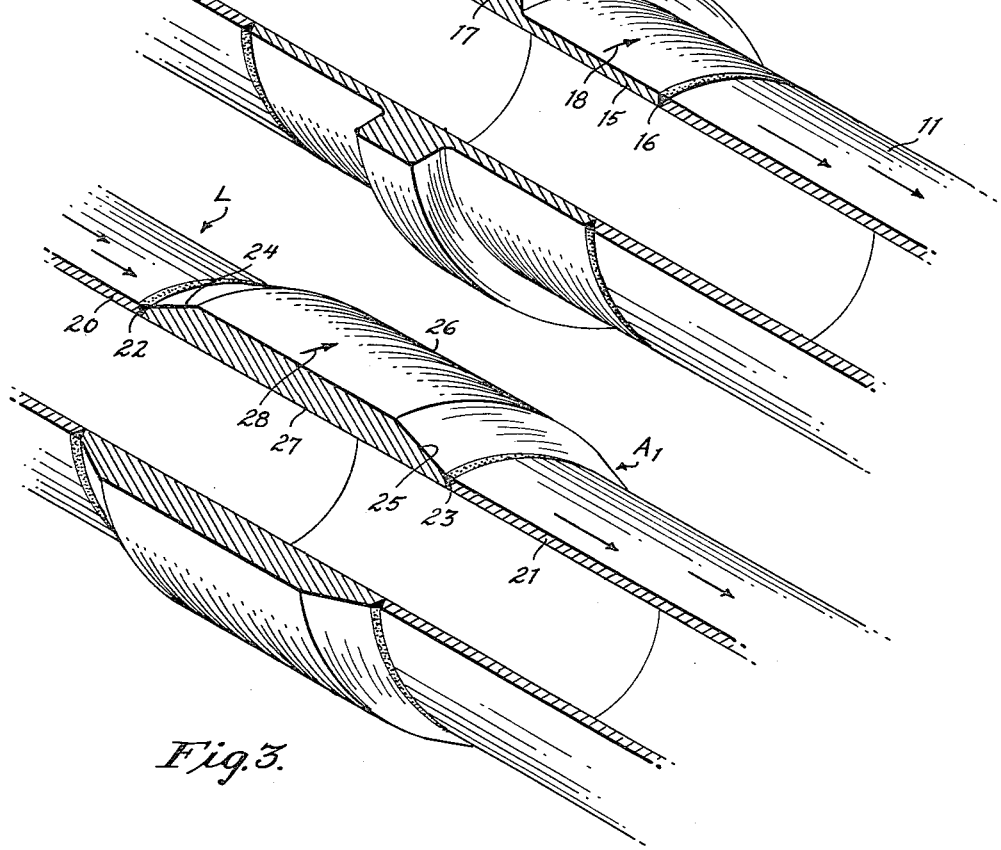
INVENTOR.
ROGER E. RISLEY
BY
ATTORNEY.

United States Patent Office 3,096,105
Patented July 2, 1963

3,096,105
SPLIT ARRESTOR HAVING CIRCUMFERENTIALLY EXTENDING GRAIN STRUCTURE FOR WELDED PIPELINES HAVING LONGITUDINALLY EXTENDING GRAIN STRUCTURE
Roger E. Risley, Bradford, Pa., assignor to Dresser Industries, Inc., Dallas, Tex., a corporation of Delaware
Filed Sept. 9, 1960, Ser. No. 54,943
3 Claims. (Cl. 285—286)

The present invention relates to welded pipelines and is concerned primarily with a split arrestor for interrupting or stopping the travel of a split along such a pipeline.

In order to accurately explain the exact nature of the objects and advantages of the invention, reference will be made to that characteristic of worked metal commonly known as the fiber. The fiber of worked metal is comparable to the grain of wood and always assumes the direction of the working. Thus when metal is rolled, the fiber assumes the direction of the rolling.

At the present time, there is a trend to use light wall, high tensile steel for building pipelines. This trend is particularly noticeable in the building of high pressure gas pipelines. In accordance with conventional practice, the pipe is produced by the manufacturer in sections of standard length, usually forty feet. These lengths are welded together as the pipeline is constructed. When testing the line, if a weld fails, the pipe may split. Moreover, due to conventional manufacturing methods, the fiber of the metal runs longitudinally or axially of the pipe. This causes such ever present defects as scratches, seams or laminations to assume a longitudinal direction with the result that the split travels longitudinally at an extremely high rate of speed which has been estimated to be as much as four thousand miles per hour. Ordinarily, it will not stop until it is interrupted by a fitting, or a defective transverse weld or some other obstacle.

The creation of such splits in welded steel pipelines has proven to be extremely costly and this is easily recognized when it is considered that welded pipelines may cost as much as two hundred thousand dollars per mile.

With the foregoing conditions in mind, the present invention has in view, as its foremost objective, the provision of a split arrestor which may be incorporated into the structure of the pipeline at predetermined periodic intervals. Thus, should a split be created as by testing or for any other reason, it will travel only to one of these arrestors.

More in detail, the invention has in view, as an object, the provision of a split arrestor of the type noted which consists essentially of a pipe section of substantially the same steel as that used in the construction of the pipeline, but which section has the fiber of the metal running circumferentially thereof rather than axially thereof.

A further object is to provide in a split arrestor of the character indicated, a ring like portion or member having a thickness appreciably greater than the wall thickness of the pipeline in which the arrestor is included. This portion of the arrestor should be at least fifty percent thicker than the wall of the pipeline and preferably has a thickness of two or more times the wall of the pipeline. Like the remainder of the arrestor, the fiber as determined by the direction of rolling of the metal in the thickened portion runs circumferentially thereof.

Various other more detailed objects and advantages of the invention such as arise in connection with carrying out the above noted ideas in a practical embodiment will in part become apparent and in part be hereinafter stated as the description of the invention proceeds.

The invention therefore comprises a welded steel pipeline made up of sections of standard length welded together with the fiber, determined by the direction of rolling of the metal running longitudinally thereof with split arrestors being incorporated into the structure of the pipeline at pre-determined periodic intervals with each split arrestor being of substantially the same steel as that of the pipeline, but with the fiber of the metal running circumferentially thereof, and each arrestor having a thickened portion at least fifty percent greater in thickness than the wall of the pipeline.

For a full and more complete understanding of the invention, reference may be made to the following description and accompanying drawing herein.

FIGURE 1 is a diagrammatic view of a portion of a pipeline having split arrestors incorporated therein in accordance with the precepts of this invention.

FIGURE 2 is a detailed perspective of a portion of the pipeline where a split arrestor is located there with the pipeline and arrestor broken away and shown in section; and FIGURE 3 is a similar perspective illustrating a modified form of arrestor.

Referring now to the drawings wherein like reference characters denote corresponding parts and first more particularly to FIGURE 1 a pipeline is therein illustrated and is referred to in its entirety by the reference character L. The pipeline L ordinarily would comprise a plurality of sections of standard length of light wall high tensile steel which are welded together at periodic intervals. For instance, every one half mile an arrestor is incorporated into the construction of the pipeline L. Such arrestors are shown at A.

Referring now more particularly to FIGURE 2 the line L is shown as including two pipe sections 10 and 11. In these sections 10 and 11 the fiber as determined by the direction of rolling of the metal runs longitudinally thereof. This directional quality of the fiber is depicted by the arrows 12.

One of the arrestors A is shown as incorporated into the line L between the pipe sections 10 and 11. The arrestor A throughout the major portion of its extent has a wall thickness substantially corresponding to that of the pipe sections 10 and 11. Thus, the arrestor A includes a wall section at 13 which is welded to the pipe section 10 by the weld indicated at 14. It also includes another wall section 15 that is welded to the pipe section 11 by the weld indicated at 16. Between these wall sections 13 and 15, which are substantially the same thickness as the pipe sections 10 and 11, there is a medial thickened portion 17. In the preferred form of the invention, this thickened portion will be two or more times as great in thickness as the wall sections 13 and 15.

The arrestor A should have a length at least as great as the diameter of the pipeline L. It could be as long as a standard section, forty feet. The important factor for the arrestor A is that the fiber as determined by the direction of rolling of the metal therein runs circumferentially thereof as indicated by the arrows 18. This steel ordinarily should be of substantially the same thickness as that used in the pipeline L.

It is evident that when a split travels along the line L with the fiber of the metal and encounters one of the arrestors A, it is terminated because of the change in direction of the fiber of the metal in the arrestor A and also because of the thickened portion 17. With these arrestors A located in the pipeline every one half mile, it is evident that no single split could damage more than one half mile of the pipeline.

*The Modification*

A somewhat modified form of arrestor is depicted in FIGURE 3 and referred to in its entirety by the reference character $A_1$. Like the arrestor A, it is incorporated in the line L between the pipe sections designated 20 and 21. A weld at 22 joins one end of the arrestor $A_1$ to the pipe section 20, and another weld at 23 joins the other end to the pipe section 21.

The arrestor $A_1$ has end walls immediately adjacent to the welds 22 and 23 which are substantially the same thickness as the walls of the sections 20 and 21. Extending axially inwardly, that is, toward the center of the arrestor A, are conical end faces 24 and 25 which preferably are disposed at an angle of about fourteen degrees. While this angle is not entirely critical it is believed advantageous if the angle is of the nature indicated. Between the larger ends of the conical surfaces 24 and 25, there is a cylindrical surface 26. The arrestor A also includes a bore 27. The thickness between the bore 27 and surface 26 is preferably two or more times as great as the thickness of the end faces which are welded to the pipe sections 20 and 21. The minimum permissable thickness of the arrestor $A_1$ between the surfaces 26 and 27 is one and one half times the thickness at the end face aforesaid.

Like the arrestor A, the arrestor $A_1$ has the fiber as determined by the direction of rolling of the metal extending circumferentially thereof as indicated by arrows 28.

While preferred specific embodiments of the invention are hereinbefore said, further, it is to be clearly understood that the invention is not to be limited to the exact constructions, proportions, and dimensions illustrated and described because various modifications of these details may be provided in putting the invention into practice within the purview of the appended claims.

What is claimed is:

1. In combination, a pipeline comprising a plurality of rolled thin-walled steel pipe sections having a definite fibrous longitudinally extending grain structure, said sections being welded together, and a plurality of split arrestors incorporated into said pipeline at intervals with each arrestor having each end welded to the end of an adjacent pipe section, each of said arrestors comprising a rolled tubular pipe section having a fibrous grain structure extending circumferentially thereof, whereby a split occurring in one of said sections is arrested when it reaches the next adjacent section of circumferential fibers.

2. In combination, a pipeline including a plurality of rolled thin-walled steel pipe sections having a definite fibrous longitudinally extending grain structure, said sections being welded together, and a split arrestor incorporated into said pipeline between a pair of said sections with each end of said arrestor welded to the end of an adjacent pipe section, said arrestor comprising a rolled tubular pipe section having a fibrous grain structure extending circumferentially thereof, whereby a split occurring in one of said pipeline sections is arrested when it reaches said arrestor.

3. In combination, a pipeline including a plurality of rolled thin-walled steel pipe sections having a definite fibrous longitudinally extending grain structure, said sections being welded together, and a split arrestor incorporated into said pipe line between a pair of said sections with each end of said arrestor welded to the end of an adjacent pipe section, said arrestor comprising a rolled tubular pipe section having a fibrous grain structure extending circumferentially thereof, said arrestor having a thickened portion at least fifty percent greater in thickness than said pipeline sections, whereby a split occuring on one of said pipeline sections is arrested when it reaches said arrestor.

References Cited in the file of this patent

UNITED STATES PATENTS

| 1,805,067 | Arkell | May 12, 1931 |
|---|---|---|
| 2,217,272 | Harris | Oct. 8, 1940 |
| 2,451,253 | Pierre | Oct. 12, 1948 |
| 2,494,927 | Burd | Jan. 17, 1950 |
| 2,555,256 | Tyson | May 29, 1951 |

FOREIGN PATENTS

| 454,852 | Canada | Apr. 8, 1947 |